United States Patent [19]

Sayles

[11] Patent Number: 5,047,097

[45] Date of Patent: Sep. 10, 1991

[54] STRUCTURALLY-STRONG SOLID PROPELLANTS

[75] Inventor: David C. Sayles, Huntsville, Ala.

[73] Assignee: The United States of America as represented by the Secretary of the Army, Washington, D.C.

[21] Appl. No.: 129,043

[22] Filed: Mar. 13, 1980

[51] Int. Cl.[5] ............................................. C06B 45/10
[52] U.S. Cl. ................................... 149/19.4; 149/19.9; 560/355
[58] Field of Search ............................. 149/19.4, 19.9; 560/355

[56] References Cited

U.S. PATENT DOCUMENTS

| 3,245,849 | 4/1966 | Klager et al. | 149/19.4 |
| 3,932,240 | 1/1976 | Braun et al. | 149/19.2 |
| 3,932,253 | 1/1976 | Mastrolia et al. | 149/19.4 |
| 4,019,933 | 4/1977 | Cucksee et al. | 149/19.4 |
| 4,133,706 | 1/1979 | Shoults | 149/19.2 |
| 4,142,927 | 3/1979 | Walker et al. | 149/19.4 |
| 4,263,071 | 4/1981 | Bain et al. | 149/19.4 |

OTHER PUBLICATIONS

Hawley, "The Condensed Chemical Dictionary", 9th Ed., p. 302, Van Nostrand Reinhold Co. (1977), New York.

*Primary Examiner*—Edward A. Miller
*Attorney, Agent, or Firm*—Werten F. W. Bellamy; Anthony T. Lane

[57] ABSTRACT

A diisocyanate crosslinking agent having a minimum chain length of methylene groups from 25 to 45 which has a coiling-uncoiling ability in a cured solid propellant composition (under stress and relaxing of stress) as a result of the chain length and configuration imparts superior structural strength to the solid propellant composition. A preferred species is 1,37-heptatriacontane diisocyanate, $OCN-(CH_2)_{37}-NCO$, which is employed as an effective crosslinking agent in hydroxyl-terminated polybutadiene propellants.

2 Claims, No Drawings

STRUCTURALLY-STRONG SOLID PROPELLANTS

DEDICATORY CLAUSE

The invention described herein may be manufactured, used and licensed by or for the Government for governmental purposes without the payment to me of any royalties thereon.

BACKGROUND OF THE INVENTION

Present day hydroxyl-terminated polybutadienes in solid propellant formulations are crosslinked with diisocyanates. Earlier developed propellants employed diisocyanates such as toluene 2,4-diisocyanate (also referred to as 2,4-tolylene diisocyanate, TDI etc.). Later, it was found that higher molecular weight diisocyanates such as hexamethylene diisocyanate (HDI), dimeryl diisocyanate (DDI), or isophorone diisocyanate, gave better properties because of these multi-functional crosslinking agents. The improved properties derived were essential for propellant compositions containing high solids loading. The curing cycles also resulted in better cures as a result of curing catalysts and curing accelerators employed in these types of propellants.

As the burning rate of the propellant has been enhanced to meet the performance requirement of advanced interceptors, particularly for upper-stages where ignition and pressurization (while under high stress conditions) imposes even more requirements for superior strength for the propellant, the need for such superior structural strength for the propellant well beyond the present state-of-the art has been a continued requirement.

The present requirement for solid propellant to withstand the acceleration loads imposed on them during launch of an advanced, high-acceleration interceptor whose mission is to reach a low-altitude intercept point and destroy an incoming intercontinental ballistic missile which has penetrated the defense has created the need for ultrahigh strength mechanical properties well beyond that of the present state-of-the-art propellants.

Studies have been carried out which indicate that current tensile strength of 200 psi and strain of maximum stress of 25% would be far too low by a factor of three for tensile strength, and a factor of two on strain at maximum stress for an unsupported gain.

The state-of-the-art was improved by employing a perforated, support tube which was fitted into the grain's perforation to mechanically reinforce the propellant grain. This feature was particularly advantageous where pressurization and ignition were required for upper stages which were already subjected to extra stresses and forces as a result of high-accelerations and maneuvers of the high-acceleration interceptor.

Achieving tensile strength of 600 psi is unachievable through any modification which has been investigated with state-of-the-art propellants, even with those which have a considerably lower burning rate then that required of interceptor propellants. To further complicate matters relative to propellant mechanical properties, the interceptor propellants contain high percentages of liquid burning rate accelerators, and these liquid burning rate accelerators, which function also as partial plasticizers, tend to degrade the mechanical properties.

An object of this invention is to provide a method of synthesizing solid missile propellants which have structural strengths well beyond those of the state-of-the-art propellants.

A further object of this invention is to provide structurally-strong solid propellants which have structural strengths well beyond those strengths of the state-of-the-art propellants.

SUMMARY OF THE INVENTION

The method of synthesizing solid missile propellants to achieve structural strengths used beyond that of the state-of-the-art propellants employs diisocyanates of increased chain lengths for crosslinking the propellant formulations. The increased chain length diisocyanate permits the crosslinked hydroxyl-terminated polybutadiene polymers in the solid propellant formulations to undergo an uncoiling action as the polymer is subjected to stress or a coiling action when the stress is relaxed. A preferred, representative diisocyanate, 1,37-heptatriacontaine, has a coiled configuration which can uncoil when the polymer is stressed, and coil when the stress is relaxed. When the presentative diisocyanate is employed as the crosslinking agent for a hydroxyl-terminated polybutadiene prepolymer of a higher functionality, the number of crosslink sites and the coiled chain length distance between the cure sites are increased. As a result, dramatic increases in the mechanical properties capabilities are achieved. The simultaneous increase in the number of crosslinks per unit volume translates to increased tensile capability while the average coiled chain length between cure sites translates to increased propellant elongation. Of particular significance is the fact that this produces a situation which does not occur in conventional propellants, i.e., improvements in the propellant's stress and elongation are accomplished without having to trade off one for the other.

DESCRIPTION OF THE PREFERRED EMBODIMENT

A diisocyanate having a minimum chain length of methylene groups from 25 to 45 which enables the diisocyanate to perform a coiling-uncoiling action (under stress and relaxing of stress) as a result of the increased chain length and configuration of the diisocyanate crosslinking agent. A preferred species is 1,37-heptatriacontane diisocyante, $OCN-(CN_2)_{37}-NCO$, which is employed as an effective crosslinking agent in hydroxyl-terminated polybutadiene propellants. The improved mechanical properties of the propellant crosslinked with 1,37-heptatriacontane diisocyanate results from the 37 methylene groups being arranged in a coiled configuration which uncoils when the polymer is stressed, and which coils when the stress is relaxed.

The synthesis of the 1,37-heptatriacontane diisocyante can be effected by starting with the eicosanedioic acid (1,18-octadecane dicarboxylic acid) and converting it into the half ester; then into the monoalkyl 2-oxononatricontanedioate; reducing the latter to the monoalkyl monatricontanedioate; and then further conversion into the 1,37-heptatricontane diisocyante.

The chemical formulas of the (1) starting, (2a–2d) intermediate compounds, and (3) final compound are as follows:

1. $HO_2C-(CH_2)_{18}-CO_2H$
2a. $RO_2C-(CH_2)_{18}-CO_2H$
 b. $RO_2C-(CH_2)_{18}-CO-(CH_2)_{18}-CO_2H$
 c. $RO_2C-(CH_2)_{37}-CO_2H$ d. $H_2N-CO-(CH_2)_{37}-CO-NH_2$

3. $ONC-(CH_2)_{37}-NCO$

The descriptive information and data available on the starting material, eicosanedioic acid from the Dictionary of Organic Compounds is presented in TABLE 1 below. Test data for the final compound when used in a propellant composition is shown in Table 2 below.

Table 2, with title: "Comparison of Ultrahigh-Burning Rate Composite Propellants Containing 1,37-Heptatriacontane Diisocyanate", shows the superior structural strength achieved as a result of using 1,37-heptatriacontane in Experimental Propellant B to replace the conventional crosslinking agent, isophorone diisocyante, employed in Control Propellant A.

TABLE 1

Eicosanedioic Acid (Octadecane-1:18-dicarboxylic acid)
$HO_2C-[CH_2]_{18}-COOH$
$C_{20}H_{38}O_4$                                        MW 342
Cryst. from $C_6H_6$ or EtOH. M.p. 122-3° (125.4-126.6°).
Di-Me ester: $C_{22}H_{42}O_4$. MW 370. Platelets from MeOH. M.p. 65.6-66°
Di-Et ester: $C_{24}H_{46}O_4$. MW 398. M.p. 54.5-55°.
B.P. 230-2°/2 mm.
Dianilide: cryst. from EtOH. M.p. 143-6°
Di-(p-bromophenyacyl) ester: m.p. 143.5°
Chuit, Hausser, Helv. Chim. Acta, 1929, 12,856.
Canonica, Martindli, Bacchetti, Atti accad. nazl.
Lincei, Rend., Classe sci. fis., mat. e nat., 1952,
13, 61 (Chem. Abstracts, (1953, 47, 11132).
Kreuchunas, J. Am. Chem. Soc., 1953, 75, 339.
Gunthard, Heinemann, Prelog, Helv. Chim. Acta, 1953, 36, 1147.
Black, Weedon, J. Chem. Soc., 1953, 1785.
Kananiwa, Isono, Ann. Rept. Fac. Pharm. Kanazawa Univ., 1952, 2, 30 (Chem. Abstracts, 1955, 49, 1565).

directly from the increase in the number of crosslinks per unit volume (which relates to the increased tensile strength capability), while the average coiled chain length between cure sites relates to the increased propellant elongation. The achievement for the propellant composition is an improvement in the stress and elongation values without having to trade off one for the other as is the case with conventional propellants.

The crosslinking compounds of this invention are assigned the formula $ONC-(R)_x-NCO$, wherein R equals $CH_2$ and X equal integers from 25 through 45. The length of chain is determined by the synthesis outlined hereinabove wherein the starting acid is a dicarboxylic acid with the $-COOH$ groups at the alpha and omega positions and the chain length of the $CH_2$ groups are based on integers from 12 through 22.

The crosslinking agent of this invention is used to replace any of the diisocyanates which are used in hydroxyl-terminated polybutadienes in solid propellant formulations, particularly, where the need exists for a propellant with superior structural strength. Inasmuch as it is desirable to have increased strengths to a wide range of propellants without a sacrifice to the cost or usefulness thereof, the diisocyanate crosslinking agent of this invention is useful in any hydroxyl-terminated polybutadiene propellants. Other hydroxyl terminated dienes that are crosslinked by diisocyanates are also useful as the binder constituent. The binder portion of the propellant of this invention can made up to about 25 weight percent of the propellant composition. Aluminum metal fuel can be used up to about 20 weight percent of the propellant composition. An oxidizer of ammonium perchlorate can be used up to about 80 weight

TABLE 2
COMPARISON OF ULTRAHIGH-BURNING RATE COMPOSITE PROPELLANTS CONTAINING 1,37-HEPTATRICONTANE DIISOCYANATE

| INGREDIENTS | CONTROL PROPELLANT A WEIGHT PERCENT | EXPERIMENTAL PROPELLANT B WEIGHT PERCENT |
|---|---|---|
| HYDROXYL-TERMINATED POLYBUTADIENE PREPOLYMER | 5.47 | 5.40 |
| BA-114* | 0.33 | 0.327 |
| TRIMETHYLOLPROPANE | 0.067 | 0.066 |
| N-HEXYLCARBORANE | 9.90 | 9.82 |
| ULTRAFINE AMMONIUM PERCHLORATE (1 μm)(4.3 m²/g) | 60.4 | 60.8 |
| AMMONIUM PERCHLORATE (70 μm) | 19.8 | 19.6 |
| ALUMINUM POWDER | 3.31 | 3.28 |
| TRIPHENYLBISMUTHINE | 0.033 | 0.033 |
| ISOPHORONE DIISOCYANATE | 0.721 | — |
| 1,37-HEPTATRICONTANE DIISOCYANATE | — | 0.717 |
| PROPERTIES | VALUE | |
| BURNING RATE (2000 PSI)(CM/S)(IPS) | 24.9/9.8 | 26.9/10.6 |
| PRESSURE EXPONENT | 0.70-0.80 | 0.65-0.70 |
| MAXIMUM STRESS (PSI) | 235-245 | 425-450 |
| STRAIN @ MAX. STRESS (PSI) | 22-25 | 60-70 |
| MODULUS (PSI) | 1100-1200 | 1400-1500 |

*REACTION PRODUCT OF 12-HYDROXYLSTEARIC ACID AND TRIS(2-METHYLAZIRIDINYLPHOSPHINE OXIDE

The coiling-uncoiling capability for the diisocyanate crosslinking agent of this invention is considered operative for the chain length of methylene group from 25 to 45 and with isocyanate terminal groups for each chain length which are reactive with the functional groups of the hydroxyl-terminated polybutadiene prepolymer. Thus, as a result of the increased chain length, i.e., the increased coiled chain length distance between the cure sites, and through the use of an hydroxyl-terminated polybutadiene prepolymer of higher functionality to provide an increase in the number of crosslink sites, dramatic increases in the mechanical properties are achieved. The increased mechanical properties result percent of the propellant composition. The diisocyante crosslinking can be used in an amount from about 0.3 to about 0.8 weight percent of the propellant compositions. The enumerated major ingredients which should total 100 percent in a specific composition are noted; however, the usefulness of the diisocyanate crosslinking agent of this invention can be extended to any modified composition where the composition includes additional ingredients such as burning rate catalysts, high energy plasticizers, ballistic modifiers, processing aids, and the like. The catalysts and high energy plasticizers can include carborane and/or difluoroamino compounds which are well established in the high performance propellant art. The preparation and manufacturing procedure for the propellant compositions which can be crosslinked with the diisocyanate crosslinking agents of this invention are well established in the art. The only changes required would be that normally required for using a higher molecular weight crosslinking agent. These changes would be related to temperature conditions, employing dispersing aids, processing aids, or additives to extend potlife as required for forming the propellant in its final configuration whether it be by casting, extrusion, or other techniques which may be required for the final propellant grain.

I claim:

1. A structurally-strong solid propellant composition comprising a cured intimate mixture of a highly functional hydroxyl-terminated polybutadiene binder of up to about 25 weight percent of said composition; an aluminum metal fuel of up to about 20 weight percent of said composition; an oxidizer of ammonium perchlorate of up to about 80 weight percent of said composition; and a diisocyanate crosslinking agent in an amount from about 0.3 to about 0.8 weight percent of said composition, said diisocyante crosslinking agent being a compound selected from the group of compounds consisting of the diisocyanates having the formula $ONC-(R)_x-NCO$, wherein R equals $CH_2$ and X equals an integer from 25 through 45, said diisocyanate crosslinking agent having a coiled configuration with an increased chain length of methylene groups between the cure sites of said highly functional hydroxyl-terminated polybutadiene binder to contribute to increased elongation properties of said structurally-strong solid propellant composition as a result of said coiled configuration tendency to uncoil when said binder is stressed and the tendency to coil when said stress is relaxed, and said highly functional hydroxyl-terminated polybutadiene providing an increase in the number of crosslink sites for said diisocyanate crosslinking agent having said coiled configuration to contribute to increased tensile strength properties of said structurally-strong solid propellant composition.

2. The structurally-strong solid propellant composition of claim 1 wherein said diisocyanate crosslinking agent selected has the formula wherein X equals 37 and said diisocyanate crosslinking agent has the formula $OCN-(CH_2)_x-NCO$, said diisocyanate being 1,37-heptatriacontane diisocyanate.

* * * * *